(12) United States Patent
Du et al.

(10) Patent No.: US 8,804,564 B2
(45) Date of Patent: Aug. 12, 2014

(54) METHOD FOR DETERMINING DOWNLINK TIME REFERENCE

(75) Inventors: Zhongda Du, Shenzhen (CN); Zhongming Chen, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 26 days.

(21) Appl. No.: 13/520,026

(22) PCT Filed: Mar. 4, 2011

(86) PCT No.: PCT/CN2011/071523
§ 371 (c)(1),
(2), (4) Date: Jun. 29, 2012

(87) PCT Pub. No.: WO2011/124105
PCT Pub. Date: Oct. 13, 2011

(65) Prior Publication Data
US 2013/0021902 A1    Jan. 24, 2013

(30) Foreign Application Priority Data

Apr. 5, 2010    (CN) .......................... 2010 1 0165271

(51) Int. Cl.
*H04J 1/16* (2006.01)
*H04W 74/00* (2009.01)
*H04W 56/00* (2009.01)

(52) U.S. Cl.
CPC .............. *H04W 74/00* (2013.01); *H04W 56/00* (2013.01)
USPC ......................................... 370/252; 370/350

(58) Field of Classification Search
CPC ............ H04W 56/001; H04W 56/004; H04W 56/0045; H04W 56/005; H04W 56/0005; H04W 56/0055; H04W 56/0075; H04W 72/0406; H04W 74/004; H04W 74/0833

USPC ................................... 370/241–252, 338, 350
See application file for complete search history.

(56) References Cited

U.S. PATENT DOCUMENTS

2008/0080448 A1\* 4/2008 Rottinghaus .................. 370/342

FOREIGN PATENT DOCUMENTS

| CN | 101174869 A | 5/2008 |
| CN | 101505538 A | 8/2009 |

(Continued)

OTHER PUBLICATIONS

International Search Report for PCT/CN2011/071523 dated May 23, 2011.

(Continued)

*Primary Examiner* — Kan Yuen
(74) *Attorney, Agent, or Firm* — Ling Wu; Stephen Yang; Ling and Yang Intellectual Property

(57) ABSTRACT

Disclosed is a method for determining downlink time reference, including: a terminal taking a downlink primary component carrier as a time reference and determining an absolute time to send uplink data according to a time advance based on the time reference. Also disclosed is a method for determining downlink time reference, including: a terminal taking a downlink component carrier which performs random access, or a downlink component carrier corresponding to an uplink component carrier, or another downlink component carrier within a same frequency band as the downlink component carrier corresponding to the uplink component carrier as a time reference, and determining an absolute time to send uplink data according to a time advance based on the time reference.

4 Claims, 4 Drawing Sheets

(56) References Cited

FOREIGN PATENT DOCUMENTS

| | | |
|---|---|---|
| CN | 101626269 A | 1/2010 |
| JP | 2011521524 A | 7/2011 |
| JP | 2011524133 A | 8/2011 |
| JP | 2012502519 A | 1/2012 |
| WO | 2009120123 A1 | 10/2009 |
| WO | 2009132246 A2 | 10/2009 |
| WO | 2009149665 A1 | 12/2009 |
| WO | 2010025681 A1 | 3/2010 |

OTHER PUBLICATIONS

"Supporting multiple timing advance groups", 7.1.1, Qualcomm Incorporated, Discussion and decision, 3GPP TSG-RAN WG2 meeting=68bis; Valencia, Spain, Jan. 18-22, 2010, R2-100423, see pp. 2-4E.

* cited by examiner

METHOD FOR DETERMINING DOWNLINK
TIME REFERENCE

TECHNICAL FIELD

The present invention relates to the radio communication field, and particularly, to a method for determining downlink time reference.

BACKGROUND OF THE RELATED ART

In the long term evolution (abbreviated as LTE) system, the user equipment (abbreviated as UE) needs to be uplink and downlink synchronized with the E-UTRAN Node B (abbreviated as eNB) before sending uplink data to the eNB. If the UE is not downlink synchronized with this cell, then a process similar to cell search has to be performed. As shown in FIG. 1, downlink delay is acquired by way of downlink synchronization. Uplink synchronization is acquired by performing a random access process (at the same time the sending time advance (abbreviated as TA) is acquired), and TA includes uplink and downlink sending delay. TA is mainly used for determining the data sending time by the UE. Since in the LTE system, there is only one carrier in the cell, the downlink of this carrier is taken as the time reference and the time for sending uplink data (time T2 in FIG. 1) is determined in conjunction with TA. T1/T2/T3 are all absolute times, and the E-UTRAN Node B and the UE are aligned. If the UE expects that the eNB receives data at T3, then the UE has to send the data to the E-UTRAN Node B at time T2, and from the view of E-UTRAN Node B, time T2 of UE is equivalent to time T1 of the E-UTRAN Node B. The random access process includes two classes: conflict access process and no conflict access process. The uplink and downlink carriers performing a non-conflict random access process can be paired carriers with the same frequency and can also be paired carriers with different frequencies. The uplink and downlink carriers performing a conflict random access process can only be paired carriers with the same frequency. When performing the non-conflict random access process, the terminal sends a random access preamble to the E-UTRAN Node B (the component carrier sending the random access preamble is the uplink carrier which performs the random access process), and the E-UTRAN Node B returns a random access response to the terminal (the component carrier used by the E-UTRAN Node B to send the random access response is the downlink carrier which performs the random access process). When performing the conflict random access process, as shown in FIG. 2, in addition to carrying out the interaction of the above two messages, the terminal and the E-UTRAN Node B further need to carry out the interaction of the following two messages: the terminal sends a scheduling transmission message to the eNB, and the eNB returns a conflict resolution message to the terminal, for resolving the above conflict.

In order to provide higher data rate to the mobile user, the LTE-Advanced (abbreviated as LTE-A) proposes the carrier aggregation technology, and its objects are to provide larger bandwidth for the user equipment with corresponding ability and improve the peak rate of the UE. In the LTE, the maximum downlink transmission bandwidth supported by the system is 20 MHz, and the carrier aggregation refers to aggregate two or more component carriers (abbreviated as CC) to support a downlink transmission bandwidth greater than 20 MHz and no more than 100 MHz.

The component carrier can use bands already defined by the LTE and can also use dedicated bands newly added for the LTE-A. Since currently there is a lack of spectrum resources and there can not always be component carriers continuous in the frequency domain allocated to the operators for use, the carrier aggregation can be divided into continuous carrier aggregation and non-continuous carrier aggregation according to whether component carriers are continuous in the frequency domain. The carrier aggregation can be divided into single band carrier aggregation and multiple frequency band carrier aggregation based on whether the component carriers are within the same frequency band. The so-called single band carrier aggregation refers to that all the component carriers participating in carrier aggregation are within the same band, and the single band carrier aggregation can be continuous carrier aggregation or non-continuous carrier aggregation. The so-called multiple frequency band carrier aggregation refers to that component carriers participating in carrier aggregation can be from different bands. LTE UE can only receive and transmit data on a LTE compatible component carrier, and an LTE-A UE with carrier aggregation capability (for the sake of description, the UE in the following is such UE, only when specially stated) receive and transmit data on a plurality of component carriers simultaneously. As a contrast, the sending device and receiving device of the UE can be a set of baseband devices, with one single band and the bandwidth thereof being greater than 20 MHz, and can also be multiple sets of baseband devices, with multiple bands and the bandwidth of each band being less than 20 MHz.

In the LTE-A system, after having entered the connection state, the UE can communicate with the source eNB via a plurality of component carriers (such as CC1 and CC2) simultaneously, wherein CC1 is a primary component carrier (abbreviated as PCC), and the other such as CC2 is a secondary component carrier (abbreviated as SCC). The terminal acquires information about the Non-Access Stratum (abbreviated as NAS) (such as Evolved Cell Global Identity (abbreviated as ECGI) and Tracking Area Identity (abbreviated as TAI)) via the primary component carrier, if a radio link failure (abbreviated as RLF) occurs in the downlink primary component carrier, then the UE has to perform a radio resource control (abbreviated as RRC) reestablishment process. After the UE has entered into the connection state from the idle state, the accessing component carrier is the primary component carrier. When the UE is in the connection state, the network can complete the conversion of PCC by way of RRC reconfiguration or intra-cell handover, or the network side designates the primary component carrier during the process of notifying the UE to carry out handover.

In addition, in order to improve the coverage of the eNB, as to some downlink carriers, such as CC2, the Remote Radio Head (abbreviated as RRH) technology can be employed, or a signal repeater can be provided, so that the eNB sends data to the UE on CC1 and CC2 simultaneously, and the time for the data of these two carriers to arrive at the UE will be different, as shown in FIG. 3. If both the uplink and downlink CC2s employ RRH or signal repeater, the eNB only configures CC2 for the UE, and there also exists the same problem. Since the uplink data sending time delays of CC1 and CC2 are the same, it is rational to maintain one TA, however, TA is a relative time quantity, and currently there is still no solution for determining the absolute time for sending uplink data according to this relative time amount.

SUMMARY OF THE INVENTION

The present invention provides a method for determining downlink time reference, solving the problem of setting the downlink time reference when the eNB employs a plurality of downlink component carriers to send downlink data to the terminal and part of the downlink components employ RRH or repeater.

In order to solve the above technical problem, the present invention provides a method for determining downlink time reference, and the method comprises:

a terminal taking a downlink primary component carrier as a time reference and determining an absolute time to send uplink data according to a time advance based on the time reference.

The method further comprises:

when the downlink primary component carrier changes, the terminal taking a new downlink primary component carrier as the time reference.

The method further comprises:

when a radio link failure occurs on the downlink primary component carrier, the terminal initiating a radio link control reestablishment process and causing the downlink primary component carrier to change, then the terminal taking the new downlink primary component carrier as the time reference.

The method further comprises:

an E-UTRAN Node B setting another downlink component carrier except the downlink primary component carrier as a downlink primary component carrier through a reconfiguration of radio link control process, and the terminal taking the new downlink primary component carrier as the time reference.

The method further comprises:

when the terminal losses uplink synchronization and uplink data arrives, the terminal reinitiating a random access process and causing the downlink primary component carrier to change, then the terminal taking the current downlink primary component carrier as the time reference.

The method further comprises:

when the terminal losses uplink synchronization, downlink data arrives, and the E-UTRAN Node B has already allocated a dedicated preamble for the terminal, the terminal reinitiating the random access process on the component carrier to which the dedicated preamble allocated by the E-UTRAN Node B belongs and causing the downlink primary component carrier to change, then the terminal taking the current downlink primary component carrier as the time reference.

The method further comprises:

the terminal carrying out E-UTRAN Node B handover, initiates the random access process on the component carrier which is provided with random access resources by the target E-UTRAN Node B and causes the downlink primary component carrier to change, then the terminal takes the downlink primary component carrier used by the target E-UTRAN Node B as the time reference.

In order to solve the above technical problem, the present invention also provides a method for determining downlink time reference, and the method comprises:

a terminal taking a downlink component carrier which performs random access, or a downlink component carrier corresponding to an uplink component carrier, or another downlink component carrier within a same frequency band as the downlink component carrier corresponding to the uplink component carrier as a time reference, and determining an absolute time to send uplink data according to a time advance based on the time reference.

The method further comprises:

after a new random access process is completed, the downlink component carrier which performs the random access process changing, and the terminal taking the new downlink component carrier which performs the random access process as the time reference.

The method further comprises:

when a radio link failure occurs on the downlink primary component carrier, the terminal initiating a radio link control reestablishment process and causing the downlink primary component carrier to change, then the terminal still taking the downlink component carrier which performs random access, or the downlink component carrier corresponding to the uplink component carrier, or another downlink component carrier within a same frequency band as the downlink component carrier corresponding to the uplink component carrier as the time reference.

The method further comprises:

when the terminal losses uplink synchronization and uplink data arrives, the terminal reinitiating a random access process, taking the downlink component carrier which performs the random access, or the downlink component carrier corresponding to the uplink component carrier, or another downlink component carrier within a same frequency band as the downlink component carrier corresponding to the uplink component carrier as the time reference.

The method further comprises:

when the terminal losses uplink synchronization and downlink data arrives, and meanwhile the E-UTRAN Node B has allocated a dedicated preamble to the terminal, the terminal reinitiating the random access process on the component carrier to which the dedicated preamble allocated by the E-UTRAN Node B belongs, and taking the downlink component carrier which performs the random access, or the downlink component carrier corresponding to the uplink component carrier, or another downlink component carrier within the same frequency band as the downlink component carrier corresponding to the uplink component carrier as the time reference.

The method further comprises:

the terminal carrying out E-UTRAN Node B handover and initiating the random access process on the component carrier which is provided with random access resources by a target E-UTRAN Node B, and the terminal taking the downlink component carrier which performs the random access, or the downlink component carrier corresponding to the uplink component carrier, or another downlink component carrier within the same band as the downlink component carrier corresponding to the uplink component carrier as the time reference.

The method further comprises:

when the downlink component carrier which performs the random access process is deleted or deactivated, the terminal taking the downlink primary component carrier as the time reference.

The method further comprises:

the terminal taking the downlink component carrier corresponding to the uplink component carrier as the time reference, after the E-UTRAN Node B has deleted the downlink component carrier, the terminal taking another downlink component carrier corresponding to the uplink component carrier as the time reference, or another downlink component carrier within the same frequency band as the downlink component carrier as the time reference.

In order to solve the above technical problem, the present invention also provides a terminal, and the terminal is configured to:

take a downlink primary component carrier as a time reference and determine an absolute time to send uplink data according to a time advance based on the time reference; or take a downlink component carrier which performs random access, a downlink component carrier corresponding to an uplink component carrier, or another downlink component carrier within a same frequency band as the downlink component carrier corresponding to the uplink component carrier as a time reference, and determine an absolute time to send uplink data according to a time advance based on the time reference.

The terminal is further configured to:

when a terminal is configured to take a downlink primary component carrier as the time reference and determine an absolute time to send uplink data according to a time advance based on the time reference, if the downlink primary component carrier changes, the terminal takes a new downlink primary component carrier as the time reference; or if a radio link failure occurs on the downlink primary component carrier, the terminal initiates a radio link control reestablishment process and causes to the downlink primary component carrier to change, then the terminal takes a new downlink primary component carrier as the time reference; or if an E-UTRAN Node B sets another downlink component carrier except the downlink primary component carrier as a downlink primary component carrier through a reconfiguration of radio link control process, the terminal takes the new downlink primary component carrier as the time reference; or if the terminal losses uplink synchronization and uplink data arrives, the terminal reinitiates a random access process and causes the downlink primary component carrier to change, then the terminal takes the current downlink primary component carrier as the time reference; or if the terminal losses uplink synchronization, downlink data arrives, and the E-UTRAN Node B has already allocated a dedicated preamble for the terminal, the terminal reinitiates the random access process on the component carrier to which the dedicated preamble allocated by the E-UTRAN Node B belongs and causes the downlink primary component carrier to change, then the terminal takes the current downlink primary component carrier as the time reference; or if the terminal carries out E-UTRAN Node B handover, initiates the random access process on the component carrier which is provided with random access resources by the target E-UTRAN Node B and causes the downlink primary component carrier to change, then the terminal takes the downlink primary component carrier used by the target E-UTRAN Node B as the time reference.

The terminal is further configured to:

when the terminal is configured to take a downlink component carrier which performs random access, or a downlink component carrier corresponding to an uplink component carrier, or another downlink component carrier within the same band as the downlink component carrier corresponding to the uplink component carrier as the time reference, and determines an absolute time to send uplink data according to a time advance on the basis of the time reference, after a new random access process is completed, the downlink component carrier which performs the random access process changes, and the terminal takes a new downlink component carrier which performs the random access process as the time reference; or when a radio link failure occurs on the downlink primary component carrier, the terminal initiates a radio link control reestablishment process and causes the downlink primary component carrier to change, then the terminal still takes the downlink component carrier which performs random access, or the downlink component carrier corresponding to the uplink component carrier, or another downlink component carrier within the same band as the downlink component carrier corresponding to the uplink component carrier as the time reference; or when the terminal losses uplink synchronization and uplink data arrives, the terminal reinitiates the random access process, takes the downlink component carrier which performs that random access, the downlink component carrier corresponding to the uplink component carrier, or another downlink component carrier within the same frequency band as the downlink component carrier corresponding to the uplink component carrier as the time reference; or when the terminal losses uplink synchronization and downlink data arrives, and at the same time, the terminal reinitiates the random access process on the component carrier to which the dedicated preamble allocated by the E-UTRAN Node B belongs and takes the downlink component carrier which performs that random access, or the downlink component carrier corresponding to the uplink component carrier, or another downlink component carrier within the same band as the downlink component carrier corresponding to the uplink component carrier as the time reference; or when the terminal carries out E-UTRAN Node B handover and initiates the random access process on the component carrier which is provided with random access resources by the target E-UTRAN Node B, the terminal takes the downlink component carrier which performs that random access, or the downlink component carrier corresponding to the uplink component carrier, or another downlink component carrier within the same band as the downlink component carrier corresponding to the uplink component carrier as the time reference; or when the downlink component carrier which performs the random access process is deleted or deactivated, the terminal takes the downlink primary component carrier as the time reference; or when the terminal takes the downlink component carrier corresponding to the uplink component carrier as the time reference, after the E-UTRAN Node B has deleted that downlink component carrier, the terminal takes another downlink component carrier corresponding to the uplink component carrier, or another downlink component carrier within the same band as the downlink component carrier as the time reference.

The present invention solves the problem of setting the downlink time reference when the eNB employs a plurality of downlink component carriers to send downlink data to the terminal and part of the downlink components employ RRH or repeater, which is simple and feasible.

PREFERRED EMBODIMENTS OF THE PRESENT INVENTION

Figure 1:
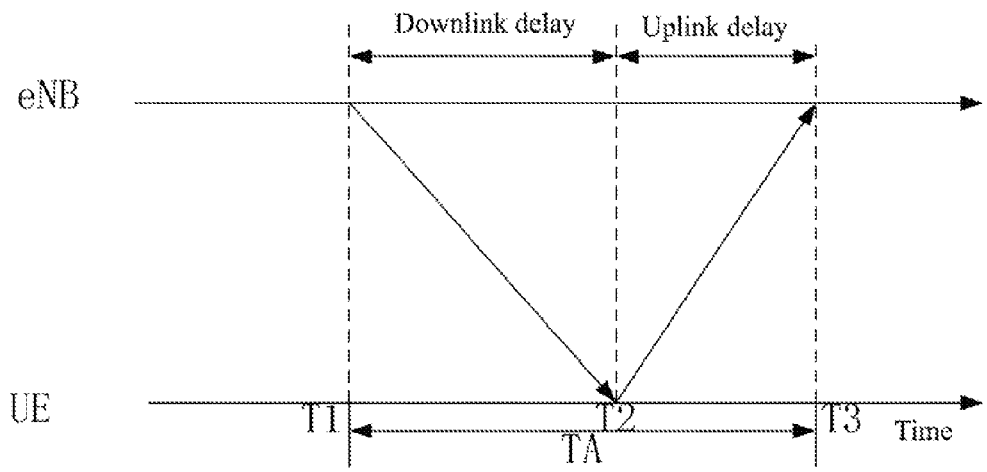
FIG. 1 is a schematic diagram of a time advance (TA) of a terminal in an LTE system.
Figure 2:
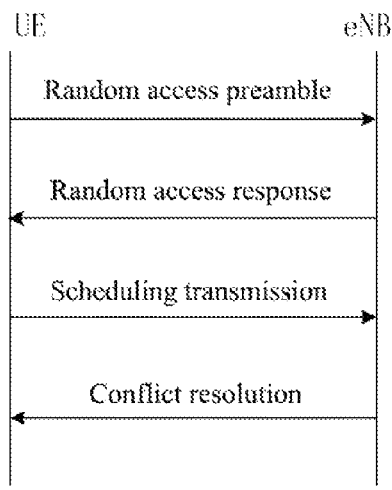
FIG. 2 is a schematic diagram of a conflict based random access process.
Figure 3:
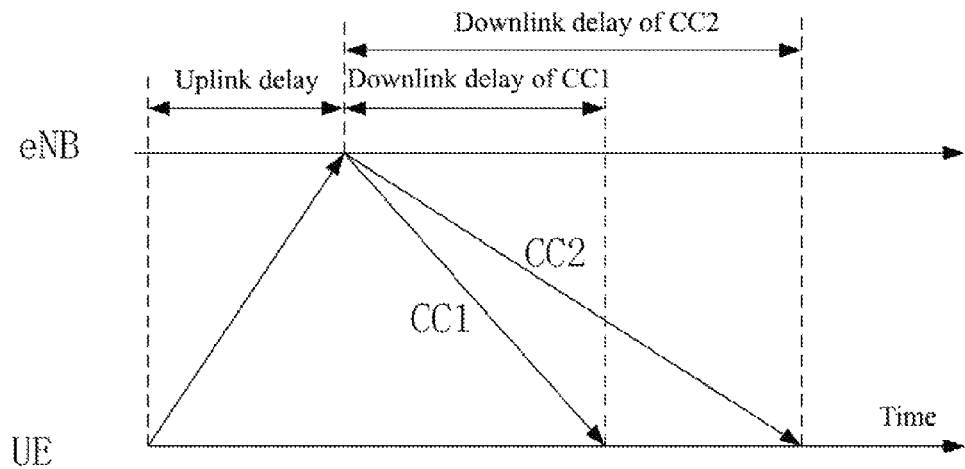
FIG. 3 is a schematic diagram of sending and receiving delay after downlink RRH or repeater is introduced into an LTE-A system.

As to the above problem, two solutions are proposed.

Solution I, a terminal takes a downlink primary component carrier as a time reference and determines an absolute time to send uplink data according to a time advance on the basis of that time reference, wherein, when the downlink primary component carrier changes, the terminal takes the new downlink primary component carrier as the time reference.

Solution II, a terminal taking a downlink component carrier which performs random access, or a downlink component carrier corresponding to an uplink component carrier, or another downlink component carrier within a same frequency band as the downlink component carrier corresponding to the uplink component carrier as a time reference, and determining an absolute time to send uplink data according to a time advance based on the time reference. The downlink component carrier which performs random access is a component carrier used by the eNB to send a random access response message. After a new random access process is completed, the downlink component carrier which performs the random access process changes, and the terminal takes a new downlink component carrier which performs the random access process as the time reference to determine the absolute time to send the uplink data.

When a radio link failure occurs on the downlink primary component carrier, the terminal initiates a radio link control reestablishment process and causes the downlink primary component carrier to change, then the terminal still takes the downlink component carrier which performs random access, or the downlink component carrier corresponding to the uplink component carrier, or another downlink component carrier within a same frequency band as the downlink component carrier corresponding to the uplink component carrier as the time reference.

When the terminal losses uplink synchronization and uplink data arrives, the terminal reinitiates a random access process, and takes the downlink component carrier which performs the random access, or the downlink component carrier corresponding to the uplink component carrier, or another downlink component carrier within a same frequency band as the downlink component carrier corresponding to the uplink component carrier as the time reference.

When the terminal losses uplink synchronization and downlink data arrives, and meanwhile the E-UTRAN Node B has allocated a dedicated preamble to the terminal, the terminal reinitiates the random access process on the component carrier to which the dedicated preamble allocated by the E-UTRAN Node B belongs, and takes the downlink component carrier which performs the random access, or the downlink component carrier corresponding to the uplink component carrier, or another downlink component carrier within the same frequency band as the downlink component carrier corresponding to the uplink component carrier as the time reference.

The terminal carries out E-UTRAN Node B handover and initiates the random access process on the component carrier which is provided with random access resources by a target E-UTRAN Node B, and the terminal takes the downlink component carrier which performs the random access, or the downlink component carrier corresponding to the uplink component carrier, or another downlink component carrier within the same band as the downlink component carrier corresponding to the uplink component carrier as the time reference.

When the downlink component carrier which performs the random access process is deleted or deactivated, the terminal takes the downlink primary component carrier as the time reference.

The terminal takes the downlink component carrier corresponding to the uplink component carrier as the time reference, after the E-UTRAN Node B has deleted the downlink component carrier, the terminal takes another downlink component carrier corresponding to the uplink component carrier as the time reference, or another downlink component carrier within the same frequency band as the downlink component carrier as the time reference.

The embodiments of the present invention will be described in great detail in conjunction with the accompanying drawings. It needs to note that the embodiments of the present application and the features in the embodiments can be combined with each other if there is no conflict.

Embodiments I, II, III and IV employ solution I, and embodiments V and VI employ solution II. In the embodiments, when the UE losses uplink synchronization and uplink or downlink data arrives, a random access process needs to be reinitiated. In the following embodiments, the band to which each component carrier belongs can be the same or different.

Embodiment I

When a radio link failure occurs on the downlink primary component carrier, the terminal initiates a radio link control reestablishment process and causes the downlink primary component carrier to change, then the terminal takes a new downlink primary component carrier as the time reference.

Figure 4:
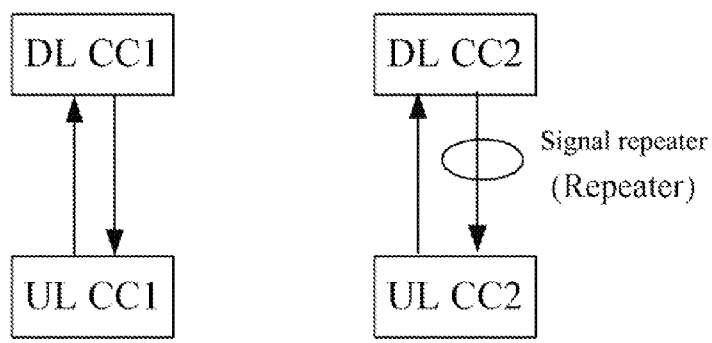
FIG. 4 is a schematic diagram of application scenarios according to embodiments one to five of the present invention.

As shown in FIG. 4, the UE resides on CC1, and initiating an RRC connection establishment request (mainly including random access process) on CC1 due to the requirements of the upper layer service, and after the random access process is completed, TA is acquired, CC1 is PCC, and then the UE enters the connection state.

Due to the requirements of the service, the network side configures CC2 for the UE for carrier aggregation, and the downlink (abbreviated as DL) CC2 is equipped with a signal repeater (if the RRH technology is employed, the following processing flow is the same), therefore, the component carriers currently simultaneously used by the UE are DL CC1, DL CC2, and uplink (abbreviated as UL) CC1, UL CC2, wherein UL CC1 and DL CC1 are PCC, and UL CC2 and DL CC2 are SCC. The UE has two receivers, which are respectively responsible for the receiving of DL CC1 and DL CC2.

Figure 5:
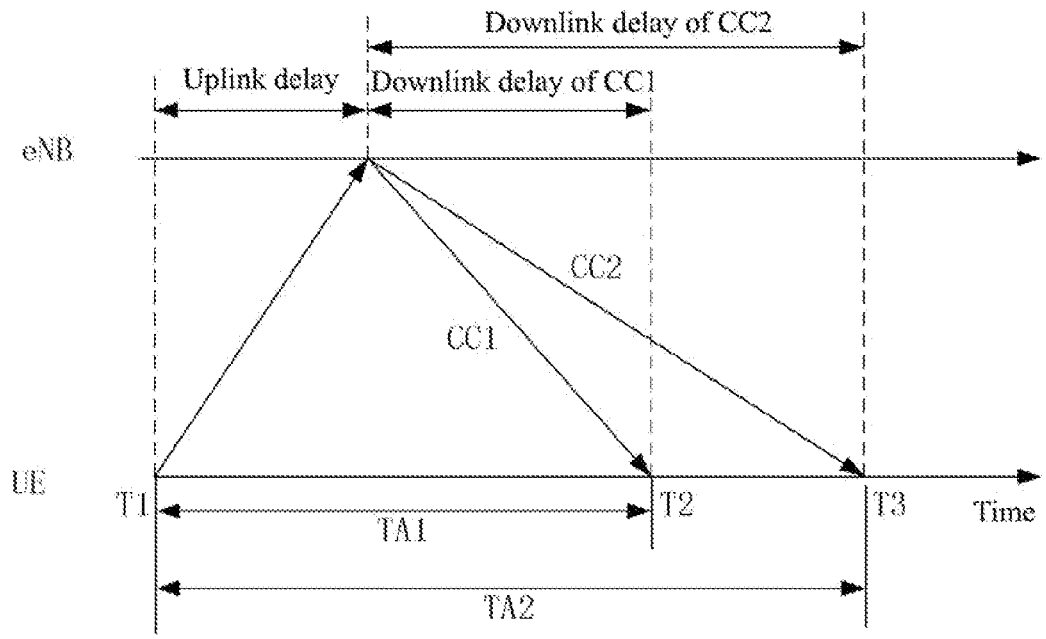
FIG. 5 and FIG. 6 are schematic diagrams of a UE determining data sending time according to a downlink time reference and TA according to embodiments one to five of the present invention.

As shown in FIG. 5, DL PCC (i.e. DL CC1) is taken as the time reference, TA is the time difference (i.e. TA1) between T2 and T1, and the UE determines the absolute time for sending data according to TA1. The data sent by the eNB to the UE via DL CC1 arrives at the UE at time T2, and the data sent to the UE via DL CC2 arrives at the UE at time T3, and the UE receives data from the eNB at time T2 and time T3 respectively.

At a certain time, since the DL CC1 signal becomes worse rapidly, DL CC1 is caused to perform RLF and trigger the UE to initiate RRC reestablishment. Since the DL CC1 signal is poor, the result of the UE performing cell selection is CC2, and initiates random access at CC2. After the random access is completed, the UE enters the connection state, and CC2 is PCC. DL PCC (i.e. DL CC2) at this moment is taken as the time reference, TA is the time difference (i.e. TA2) between T3 and T1, and the UE determines the absolute time for sending data according to TA2.

Embodiment II

The eNB sets another downlink component carrier except the downlink primary component carrier as a downlink primary component carrier through radio link control process reconfiguration, and the terminal takes the new downlink primary component carrier as the time reference.

FIG. 4 is still taken as an example for description. The UE initiates RRC connection establishment via CC1 in the LTE-A system and enters the connection state. The component carriers currently simultaneously used by the UE are DL CC1, DL CC2, UL CC1, and UL CC2, wherein UL CC1 and DL CC1 are PCC, UL CC2 and DL CC2 are SCC, and DL PCC (i.e. DL CC1) is taken as the time reference, and the absolute time for sending data is determined according to TA1. The UE has two receivers, which are respectively responsible for the receiving of DL CC1 and DL CC2.

Since the DL CC1 signal becomes worse, the eNB changes DL CC2 into DL PCC via RRC reconfiguration but does not deletes DL CC1, and because the UE and DL CC2 keep downlink synchronized all the time, after DL PCC changes to DL CC2 (i.e. after the UE replies with a reconfiguration complete message to the eNB), TA is changed to the time difference (i.e. TA2) between T3 and T1, and the UE determines the absolute time for sending data according to TA2. The data sent by the eNB to the UE via DL CC1 arrives at the UE at time T2, and the data sent to the UE via DL CC2 arrives at the UE at time T3, and the UE receives data from the eNB at time T2 and T3 respectively, as shown in FIG. 5.

Embodiment III

When the terminal losses uplink synchronization and uplink data arrives, the terminal reinitiates a random access process and causes the downlink primary component carrier to change, and then the terminal takes the current downlink primary component carrier as the time reference. When the terminal losses uplink synchronization, downlink data arrives, and the eNB has already allocated a dedicated preamble for the terminal, the terminal reinitiates the random access process on the component carrier to which the dedicated preamble allocated by the eNB belongs and causes the downlink primary component carrier to change, and then the terminal takes the current downlink primary component carrier as the time reference.

FIG. 4 is still taken as an example for description. The current UE is in the connection state in the LTE-A system, the component carriers currently simultaneously used by the UE are DL CC1, DL CC2, UL CC1, and UL CC2, wherein UL CC1 and DL CC2 are PCC, and UL CC1 and DL CC1 are SCC. The UE has two receivers, which are respectively responsible for the receiving of DL CC1 and DL CC2.

Figure 6:
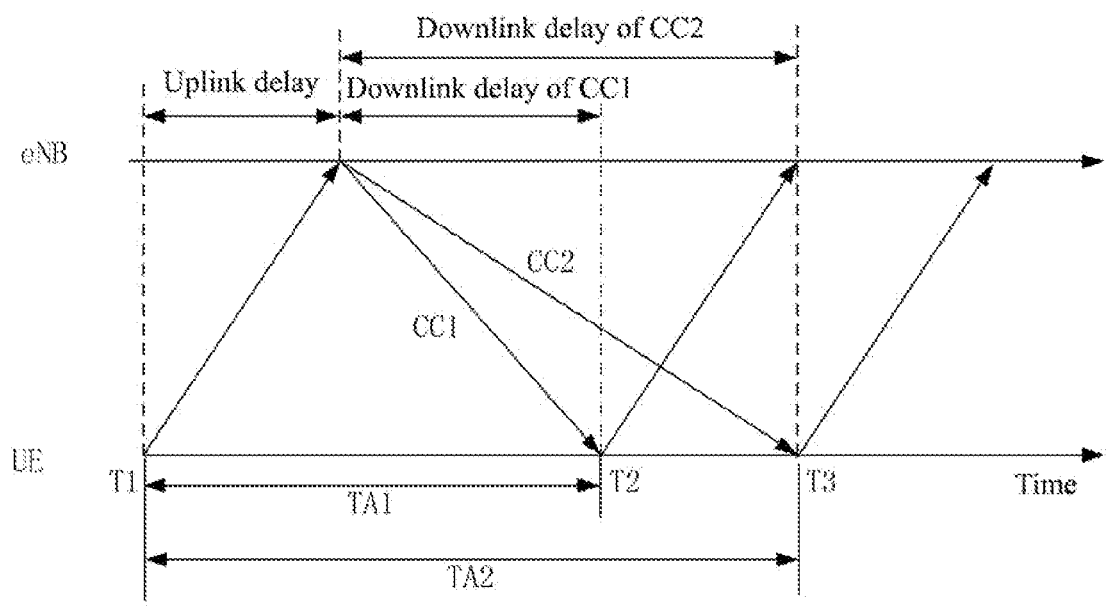

When the UE losses uplink synchronization and uplink data arrives, a random access process needs to be reinitiated, and the random access process at this moment is based on conflict. The UE selects UL CC1 and DL CC1 to initiate the random access process, since currently DL PCC (i.e. DL CC2) is taken as time reference, the UE will send a random access preamble to the eNB at time T3, and because the delays of UL CC1 and UL CC2 are the same, the obtained TA is TA2, as shown in FIG. 6.

When the UE losses uplink synchronization and downlink data arrives and the eNB allocates a dedicated preamble on CC1 to the UE, the UE needs to reinitiate a random access process, and the random access process at this moment is non-conflict. The UE initiates the random access process on UL CC1, since currently DL PCC (i.e. DL CC2) is taken as the time reference, the UE will send the random access preamble to the eNB at time T3, and since the delays of UL CC1 and UL CC2 are the same, the obtained TA is TA2, as shown in FIG. 6.

Embodiment IV

When the terminal carries out eNB handover, the terminal initiates the random access process on the component carrier which is provided with random access resources by the target eNB and causes the downlink primary component carrier to change, and then the terminal takes the downlink primary component carrier used by the target eNB as the time reference.

FIG. 4 is still taken as an example for description. The current UE is in the connection state in the LTE-A system, the source eNB decides to switch the UE to CC1 and sends a handover request message to the target eNB, and the target eNB configures CC1 and CC2 for the UE to carry out carrier aggregation, wherein, only CC1 is provided with random access resources. The UE initiates the random access process of the target eNB on CC1, and after the random access process is completed, the TA for the target eNB is obtained, CC1 is PCC, and then the UE accesses the target eNB. The component carriers currently simultaneously used by the UE are DL CC1, DL CC2, UL CC1, and UL CC2, wherein UL CC1 and DL CC1 are PCC, and UL CC2 and DL CC2 are SCC. The UE has two receivers, which are respectively responsible for the receiving of DL CC1 and DL CC2.

As shown in FIG. 5, DL PCC (i.e. DL CC1) is taken as the time reference, TA is the time difference (i.e. TA1) between T2 and T1, and the UE determines the absolute time for sending data according to TA1. The data sent by the eNB to the UE via DL CC1 arrives at the UE at time T2, and the data sent to the UE via DL CC2 arrives at the UE at time T3, and the UE receives data from the eNB at time T2 and T3 respectively.

Embodiment V

FIG. 4 is still taken as an example for description. The UE initiates RRC connection establishment via CC1 in the LTE-A system and enters the connection state. The component carriers currently simultaneously used by the UE are DL CC1, DL CC2, UL CC1, and UL CC2, wherein UL CC1 and DL CC1 are PCC, and UL CC2 and DL CC2 are SCC, and downlink CC (i.e. DL CC1) performing the random access is taken as the time reference, and the absolute time for sending data is determined according to TA1. The UE has two receivers, which are respectively responsible for the receiving of DL CC1 and DL CC2. CC1 and CC2 belong to frequency band 5.

Since the DL CC1 signal becomes worse, which cause the occurrence of RLF on DL CC1, the terminal initiates a radio link control reestablishment process, the eNB changes DL CC2 into DL PCC by way of RRC reconfiguration but does not delete DL CC1. At this moment, the uplink and downlink correlation is changed to UL CC1 and DL CC2, since the UE and DL CC1 keep downlink synchronized all the time, after DL PCC changes to DL CC2 (i.e. after the UE replies with the reconfiguration complete message to the eNB), the UE still takes the downlink CC (i.e. DL CC1) performing random access as the time reference, and the UE still determines the absolute time for sending data according to TA1. As shown in FIG. 5. In the above process, if the eNB deletes or deactivates CC1, then the UE takes the downlink primary component carrier DL PCC (i.e. DL CC2) as the time reference, and TA is also adjusted to TA2 correspondingly.

When the UE losses uplink synchronization and uplink data arrives, a random access process needs to be reinitiated, and the random access process at this moment is based on conflict. The UE selects UL CC1 and DL CC2 to initiate the random access process, since it is required to take the downlink CC (i.e. DL CC2) performing random access as the time reference, the UE will send a random access preamble to the eNB at time T3, the obtained TA is TA2, and the UE determines the absolute time for sending data according to TA2, as shown in FIG. 6.

When the UE losses uplink synchronization and downlink data arrives and the eNB allocates a dedicated preamble on CC1 to the UE, the UE needs to reinitiate a random access process, and the random access process at this moment is non-conflict. The UE initiates the random access process on UL CC1, since currently the downlink CC (i.e. DL CC2) performing random access is taken as the time reference, the UE will send a random access preamble to the eNB at time T3, the obtained TA is TA2, and the UE still determines the absolute time for sending data according to TA2, as shown in FIG. 6.

Embodiment VI

Figure 7:
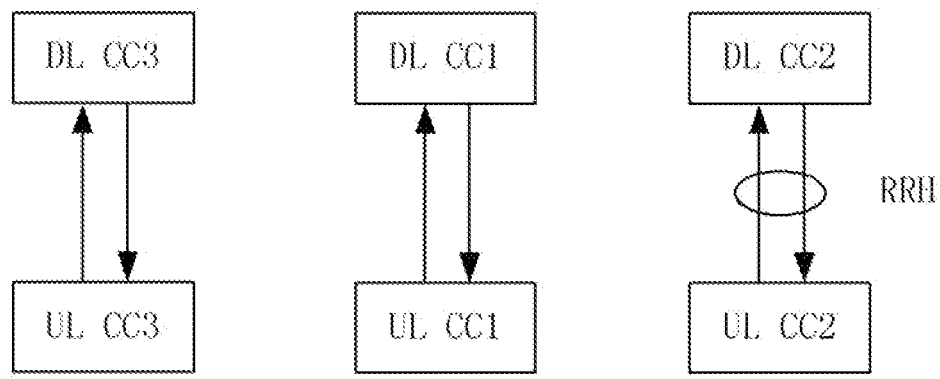
FIG. 7 is a schematic diagram of application scenarios according to embodiment six of the present invention.

FIG. 7 will be taken as an example for description, CC1 and CC3 belong to frequency band 5, and CC2 belong to frequency band 1. The UE initiates the RRC connection establishment via CC1 in the LTE-A system to enter the connection state. Due to service requirements, the eNB configures CC3 and DL CC2 for the UE, wherein DL CC2 employs RRH. The component carriers currently simultaneously used by the UE are DL CC1, DL CC2, DL CC3, UL CC1, and UL CC3, wherein UL CC1 and DL CC1 are PCC, and DL CC2, DL CC3 and UL CC3 are SCC, the downlink CC (i.e. DL CC1 or DL CC3) corresponding to UL CC is taken as the time reference, or another downlink CC (i.e. DL CC3 or DL CC1) with the same frequency band as this downlink CC is taken as the time reference, and the absolute time for sending data is determined according to TA1. Since the downlink delays of CC1 and CC3 are the same, the UE only needs to have two receivers, which are respectively responsible for the receiving of DL CC1 and DL CC3 and the receiving of DL CC2.

Figure 8:
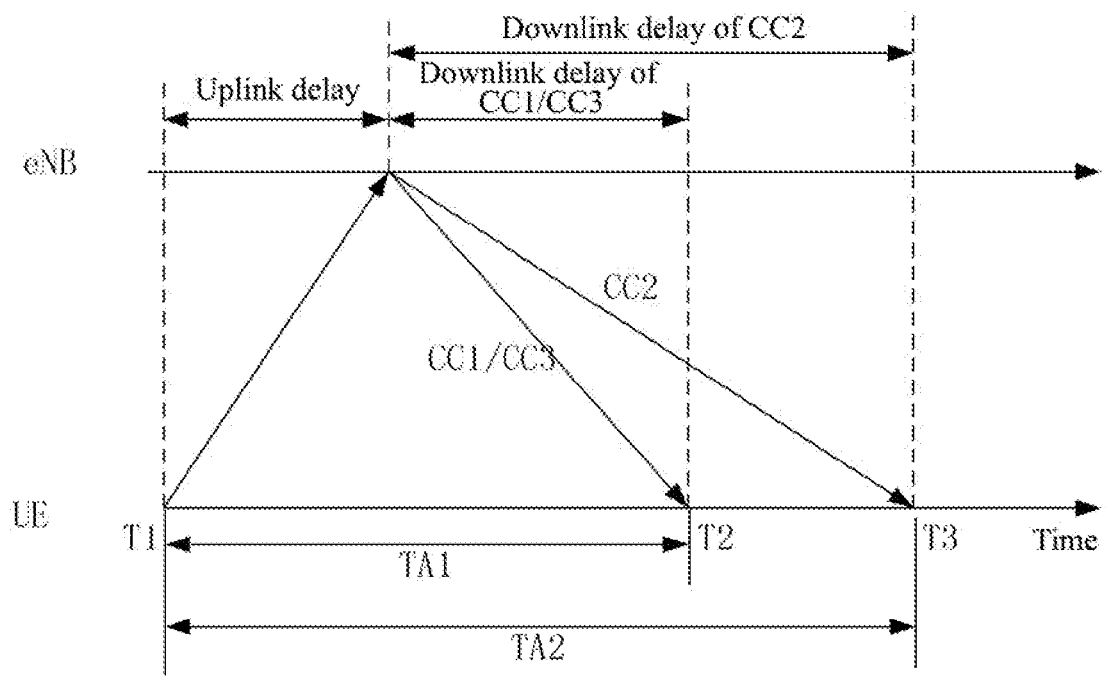
FIG. 8 is a schematic diagram of a UE determining data sending time according to a downlink time reference and TA according to embodiment six of the present invention.

Since the DL CC1 signal becomes worse, the terminal initiates a radio link control reestablishment process, and the eNB changes DL CC2 into DL PCC via the RRC reestablishment but does not delete DL CC1. At this moment, the uplink and downlink correlation is changed to UL CC1 and DL CC2. After DL PCC has been changed to DL CC2 (i.e. after the UE replies with a reconfiguration complete message to the eNB), the UE still takes the downlink CC (i.e. DL CC1 or DL CC3) corresponding to UL CC as the time reference, and the UE still determines the absolute time for sending data according to TA1. As shown in FIG. 8. If DL CC1 is deleted, then the downlink CC (such as DL CC3) with the same frequency band as DL CC1 can be taken as the time reference.

When the UE losses uplink synchronization and uplink data arrives, a random access process needs to be reinitiated, and the random access process at this moment is based on conflict. The UE selects UL CC3 and DL CC3 to initiate the random access process. The UE takes the downlink CC (i.e. DL CC1 or DL CC3) corresponding to UL CC as the time reference. The UE will send a random access preamble to the eNB at time T2, the obtained TA is TA1, and the UE still determines the absolute time for sending data according to TA1, as shown in FIG. 8.

When the UE losses uplink synchronization and downlink data arrives and the eNB allocates a dedicated preamble on CC3 to the UE, the UE needs to reinitiate a random access process, and the random access process at this moment is non-conflict. The UE initiates the random access process on UL CC3. The UE takes the downlink CC corresponding to UL CC (i.e. DL CC1 or DL CC3) as the time reference, the UE will send a random access preamble to the eNB at time T2, the obtained TA is TA1, and the UE still determines the absolute time for sending data according to TA1, as shown in FIG. 8.

In the above process, if the eNB deletes CC1, then the UE takes another downlink component carrier DL CC3 within the same frequency band as CC1 as the time reference, and the TA used is TA1.

Also disclosed is a terminal in the embodiments of the present invention, and the terminal is configured to:

take a downlink primary component carrier as a time reference and determine an absolute time to send uplink data according to a time advance based on the time reference; or take a downlink component carrier which performs random access, a downlink component carrier corresponding to an uplink component carrier, or another downlink component carrier within a same frequency band as the downlink component carrier corresponding to the uplink component carrier as a time reference, and determine an absolute time to send uplink data according to a time advance based on the time reference.

The terminal is further configured to:

when a terminal is configured to take a downlink primary component carrier as the time reference and determine an absolute time to send uplink data according to a time advance based on the time reference, if the downlink primary component carrier changes, the terminal takes a new downlink primary component carrier as the time reference; or if a radio link failure occurs on the downlink primary component carrier, the terminal initiates a radio link control reestablishment process and causes to the downlink primary component carrier to change, then the terminal takes a new downlink primary component carrier as the time reference; or if an E-UTRAN Node B sets another downlink component carrier except the downlink primary component carrier as a downlink primary component carrier through a reconfiguration of radio link control process, the terminal takes the new downlink primary component carrier as the time reference; or if the terminal losses uplink synchronization and uplink data arrives, the terminal reinitiates a random access process and causes the downlink primary component carrier to change, then the terminal takes the current downlink primary component carrier as the time reference; or if the terminal losses uplink synchronization, downlink data arrives, and the E-UTRAN Node B has already allocated a dedicated preamble for the terminal, the terminal reinitiates the random access process on the component carrier to which the dedicated preamble allocated by the E-UTRAN Node B belongs and causes the downlink primary component carrier to change, then the terminal takes the current downlink primary component carrier as the time reference; or if the terminal carries out E-UTRAN Node B handover, initiates the random access process on the component carrier which is provided with random access resources by the target E-UTRAN Node B and causes the downlink primary component carrier to change, then the terminal takes the downlink primary component carrier used by the target E-UTRAN Node B as the time reference.

The terminal is further configured to:

when the terminal is configured to take a downlink component carrier which performs random access, or a downlink component carrier corresponding to an uplink component carrier, or another downlink component carrier within the same band as the downlink component carrier corresponding to the uplink component carrier as the time reference, and determines an absolute time to send uplink data according to a time advance on the basis of the time reference, after a new random access process is completed, the downlink component carrier which performs the random access process changes, and the terminal takes a new downlink component carrier which performs the random access process as the time reference; or when a radio link failure occurs on the downlink primary component carrier, the terminal initiates a radio link control reestablishment process and causes the downlink primary component carrier to change, then the terminal still takes the downlink component carrier which performs random access, or the downlink component carrier corresponding to the uplink component carrier, or another downlink component carrier within the same band as the downlink component carrier corresponding to the uplink component carrier as the time reference; or when the terminal losses uplink synchronization and uplink data arrives, the terminal reinitiates the random access process, takes the downlink component carrier which performs that random access, the downlink component carrier corresponding to the uplink component carrier, or another downlink component carrier within the same frequency band as the downlink component carrier corresponding to the uplink component carrier as the time reference; or when the terminal losses uplink synchronization and downlink data arrives, and at the same time, the terminal reinitiates the random access process on the component carrier to which the dedicated preamble allocated by the E-UTRAN Node B belongs and takes the downlink component carrier which performs that random access, or the downlink component carrier corresponding to the uplink component carrier, or another downlink component carrier within the same band as the downlink component carrier corresponding to the uplink component carrier as the time reference; or when the terminal carries out E-UTRAN Node B handover and initiates the random access process on the component carrier which is provided with random access resources by the target E-UTRAN Node B, the terminal takes the downlink component carrier which performs that random access, or the downlink component carrier corresponding to the uplink component carrier, or another downlink component carrier within the same band as the downlink component carrier corresponding to the uplink component carrier as the time reference; or when the downlink component carrier which performs the random access process is deleted or deactivated, the terminal takes the downlink primary component carrier as the time reference; or when the terminal takes the downlink component carrier corresponding to the uplink component carrier as the time reference, after the E-UTRAN Node B has deleted that downlink component carrier, the terminal takes another downlink component carrier corresponding to the uplink component carrier, or another downlink component carrier within the same band as the downlink component carrier as the time reference.

Above description is only to illustrate the preferred embodiments but not to limit the present invention, and any amendments, equivalent substitutions, improvements etc. within the spirit and principle of the present invention are all concluded in the scope of protection of the present invention.

Those skilled in the art shall understand that all of or part of the steps in the above methods can be completed by instructing relevant hardware by programs, and the programs can be stored in a computer readable storage medium, such as read only memory, magnetic disk, or optical disk, etc. Optionally, all of or part of the steps of the above embodiments can also be implemented using one or more integrated circuits. Accordingly, the respective module/unit in the above embodiments can be implemented by use of hardware or software function module. The present invention is not limited to any particular form of combination of hardware and software.

INDUSTRIAL APPLICABILITY

The present invention solves the problem of setting the downlink time reference when the E-UTRAN Node B employs a plurality of downlink component carriers to send downlink data to the terminal and part of the downlink components employ RRH or repeater, which is simple and feasible.

What we claim is:

1. A method for determining downlink time reference, comprising:

a terminal taking a downlink primary component carrier as a time reference and determining an absolute time to send uplink data according to a time advance based on the time reference;

when the terminal losses uplink synchronization, downlink data arrives, and the E-UTRAN Node B has already allocated a dedicated preamble for the terminal, the terminal reinitiating the random access process on the component carrier to which the dedicated preamble allocated by the E-UTRAN Node B belongs and causing the downlink primary component carrier to change, then the terminal taking the current downlink primary component carrier as the time reference.

2. A method for determining downlink time reference, comprising:

a terminal taking a downlink component carrier which performs random access, or a downlink component carrier corresponding to an uplink component carrier, or another downlink component carrier within a same frequency band as the downlink component carrier corresponding to the uplink component carrier as a time reference, and determining an absolute time to send uplink data according to a time advance based on the time reference;

when a radio link failure occurs on the downlink primary component carrier, the terminal initiating a radio link control reestablishment process and causing the downlink primary component carrier to change, then the terminal still taking the downlink component carrier which performs random access, or the downlink component carrier corresponding to the uplink component carrier, or another downlink component carrier within a same frequency band as the downlink component carrier corresponding to the uplink component carrier as the time reference; or when the terminal losses uplink synchronization and downlink data arrives, and meanwhile the E-UTRAN Node B has allocated a dedicated preamble to the terminal, the terminal reinitiating the random access process on the component carrier to which the dedicated preamble allocated by the E-UTRAN Node B belongs, and taking the downlink component carrier which performs the random access, or the downlink component carrier corresponding to the uplink component carrier, or another downlink component carrier within the same frequency band as the downlink component carrier corresponding to the uplink component carrier as the time reference.

3. A terminal, comprising a processor and a storage device, wherein the storage device stores processor-executable programs, when the programs stored in the storage device are executed by the processor, the terminal is configured to:
- take a downlink primary component carrier as a time reference and determine an absolute time to send uplink data according to a time advance based on the time reference; or
- take a downlink component carrier which performs random access, a downlink component carrier corresponding to an uplink component carrier, or another downlink component carrier within a same frequency band as the downlink component carrier corresponding to the uplink component carrier as a time reference, and determine an absolute time to send uplink data according to a time advance based on the time reference;
- when the terminal losses uplink synchronization, downlink data arrives, and the E-UTRAN Node B has already allocated a dedicated preamble for the terminal, the terminal reinitiates the random access process on the component carrier to which the dedicated preamble allocated by the E-UTRAN Node B belongs and causes the downlink primary component carrier to change, then the terminal takes the current downlink primary component carrier as the time reference.

4. The terminal as claimed in claim 3, further configured to:
- when a radio link failure occurs on the downlink primary component carrier, the terminal initiates a radio link control reestablishment process and causes the downlink primary component carrier to change, then the terminal still takes the downlink component carrier which performs random access, or the downlink component carrier corresponding to the uplink component carrier, or another downlink component carrier within the same band as the downlink component carrier corresponding to the uplink component carrier as the time reference; or
- when the terminal losses uplink synchronization and downlink data arrives, and at the same time, the terminal reinitiates the random access process on the component carrier to which the dedicated preamble allocated by the E-UTRAN Node B belongs and takes the downlink component carrier which performs that random access, or the downlink component carrier corresponding to the uplink component carrier, or another downlink component carrier within the same band as the downlink component carrier corresponding to the uplink component carrier as the time reference.

* * * * *